United States Patent [19]

Anderson et al.

[11] Patent Number: 5,179,441

[45] Date of Patent: Jan. 12, 1993

[54] NEAR REAL-TIME STEREO VISION SYSTEM

[75] Inventors: Charles H. Anderson, La Canada; Larry H. Matthies, La Crescenta, both of Calif.

[73] Assignee: The United States of America as represented by the Administrator of the National Aeronautics and Space Administration, Washington, D.C.

[21] Appl. No.: 812,901

[22] Filed: Dec. 18, 1991

[51] Int. Cl.$^5$ .................. H04N 13/00; H04N 7/133
[52] U.S. Cl. ..................................... 358/88; 358/133
[58] Field of Search ............................. 358/88, 133

[56] References Cited

U.S. PATENT DOCUMENTS

| 4,718,104 | 1/1988 | Anderson | 358/133 |
| 4,905,081 | 2/1990 | Morton | 358/88 |
| 5,103,306 | 4/1992 | Weiman | 358/133 |

OTHER PUBLICATIONS

"Computing dense displacement fields with confidence measures in scenes containing occlusion", published in Proc. of DARPA Image Understanding Workshop, pp. 236-246, SAIC, 1984, P. Anadan.

"Modelling the environment of an exploring vehicle by means of stereo vision", D. B. Gennery, Stanford University, Jun. 1980.

"Practical Real-Time Imaging Stereo Matcher", H. K. Nishihara, Sep./Oct. issue of Optical Engineering, vol. 23, No. 5, 1984.

"Stereo by intra- and inter-scanline search using dynamic programming", Y. Ohta and T. Kanade, IEEE Trans. Pattern Analysis and Machine Intelligence, PAMI-7(2): 139-154, Mar. 1985.

"Computational vision and regulation theory", T. Poggio, V. Torre, and C. Koch, Nature, 317(n): 314-319, Sep. 1985.

Primary Examiner—Howard W. Britton
Attorney, Agent, or Firm—John H. Kusmiss; Thomas H. Jones; Guy M. Miller

[57] ABSTRACT

Apparatus and methods for near real-time stereo vision system for use with a robotic vehicle comprises two cameras mounted on three-axis rotation platforms, image-processing boards, a CPU, and specialized stereo vision algorithms. Bandpass-filtered image pyramids are computed, stereo matching is performed by least-squares correlation, and confidence ranges are estimated by means of Bayes' theorem. In particular, Laplacian image pyramids are built and disparity maps are produced from the $60 \times 64$ level of the pyramids at rates of up to 2 seconds per image pair. The first autonomous cross-country robotic traverses (of up to 100 meters) have been achieved using the stereo vision system of the present invention with all computing due aboard the vehicle. The overall approach disclosed herein provides a unifying paradigm for practical domain-independent stereo ranging.

16 Claims, 5 Drawing Sheets

NEAR REAL-TIME STEREO VISION SYSTEM

ORIGIN OF THE INVENTION

The invention described herein was made in the performance of work under a NASA Contract, and is subject to the provisions of Public Law 96-517 (35 U.S.C. 202) in which the Contractor has elected not to retain title.

TECHNICAL FIELD

The invention relates to methods and apparatus for near real-time stereo vision, and in particular to such a system for use in making possible the autonomous cross-country traversal of a robotic vehicle, the system comprising two parallel cameras mounted on special platforms, specialized image processing hardware, and unique stereo matching algorithms.

BACKGROUND ART

Practical considerations dictate that robotic vehicles be operable in both teleoperated and semi-autonomous modes. In the teleoperated mode, stereo cameras on board the vehicle may provide three-dimensional scene information to human operators via stereographic displays. In the semi-autonomous mode, three-dimensional information is also required for automatic obstacle avoidance and must be provided by onboard rangefinders.

Automatic stereo triangulation, or "stereo vision," is a very attractive approach to onboard rangefinding, in part because the necessary video hardware is already required for teleoperation and in part because stereo has a number of potential advantages over other rangefinding technologies. These advantages include the fact that stereo is passive, nonscanning, nonmechanical, and uses very little power.

The practicality of stereo vision has been limited by the slow speed of existing systems and a lack of consensus on basic paradigms for approaching the stereo problem. The present invention uses a synthesis of approaches based on area correlation, random field modeling, and compact, commercial hardware to produce a stereo system that gives range images from 60×64 stereo pairs at rates of up to 2 seconds per frame.

Previous stereo vision work has been grouped into categories according to which geometric model of the world was employed, which optimization (i.e. search) algorithms were employed for matching, and which constraints were imposed to enhance the reliability of the stereo matching process. Primary approaches to geometry have been to use either feature-based or field-based world models.

Feature-based approaches typically extract two-dimensional points or line segments from each image, match these, and output the parameters of the corresponding three-dimensional primitives. Field-based models consist of discrete raster representations, in particular the "disparity field" specifying the stereo disparity at each pixel in the image.

Field-based approaches typically perform matching by area correlation. A wide variety of search algorithms have been used, including dynamic programming, gradient descent, simulated annealing, and deterministic, iterative "local support" methods.

Coarse-to-fine search techniques using image pyramids can be combined with most of these methods to greatly improve their efficiency. Finally, many sources of search constraint have been used to reduce the likelihood of false matches, including multispectral images, surface smoothness models, and redundant images, as in trinocular stereo or motion-based bootstrap strategies.

The application of statistical modeling and estimation methods has been growing in both feature-based and field-based approaches. The use of surface smoothness models, which is known to be effective in practice, is fitting into the statistical framework through a relationship to prior probabilities in Bayesian estimation. The power of coarse-to-fine search, redundant images, and "active" or "exploratory" sensing methods is well known.

A basic issue is the question of which type of feature- or field-based model might provide the most general approach to stereo vision. The roots of stereo vision lie in the use of area correlation for aerial triangulation. In the machine vision community of the 1970s and 1980s, correlation was believed by many to be too slow or to be inappropriate for other reasons, so methods based on edges or other types of features became popular. However, feature-based methods also have limitations due to feature instability and the sparseness of estimated range images. The present invention shows that correlation methods can be fast, computationally inexpensive, and potentially useful in many contexts.

Another important issue is which combination or combinations of search algorithms and constraints provide the most efficient and reliable performance. Powerful global search algorithms such as simulated annealing and three-dimensional dynamic programming may give accurate results, but they are very expensive computationally. Analogously, using multispectral or redundant images provides more information, but increases the hardware and computational cost of a system. It is likely that comparatively simple methods will lead to fast and usually reliable performance, as shown in the paper "Practical Real-Time Imaging Stereo Matcher," by H. K. Nishihara, published in the September/October 1984 issue of Optical Engineering, volume 23, number 5.

The question then arises whether there are inexpensive performance metrics that can be used to determine when matching is not reliable, and whether such metrics can be used to control switching between simple, fast procedures when these work and more powerful, expensive procedures when scene characteristics make them necessary.

U.S. Pat. No. 4,905,081 to Morton discloses a method and apparatus for transmitting and receiving three-dimensional video pictures. Transmission of video pictures containing depth information is achieved by taking video signals from two sources, showing different representations of the same scene and correlating them to determine a plurality of peak correlation values which correspond to vectors representing depth information. The first video signal is divided into elementary areas and each block is tested, pixel by pixel, with each vector to see which vector gives the best fit in deriving the second video signal from the first. The vectors which give the best fit are then assigned to their respective areas of the picture and constitute difference information. The first video signal and the assigned vectors are then transmitted in parallel. The first video signal can be received as a monoscopic picture, or alternatively the vectors can be use to modified the first signal to form a display containing depths.

As mentioned in the patent to Morton, the method can be used as a remote sensing technique for use with robots in hazardous environments. Such robots often use stereoscopic television to relay a view of their surroundings to an operator, and the technique described could be used to derive and display the distance of an object from a robot to avoid the need for a separate rangefinder. For autonomous operation of the robot, however, information concerning the distance to a hazardous object in the environment of the robot must be available in near real-time.

The slow speed of prior-art stereo vision systems has posed a major hurdle in the performance of semi-autonomous robotic vehicles. Semi-autonomy in combination with teleoperation is desired for many tasks involving remote or hazardous operations, such as planetary exploration, waste cleanup, and national security. A major need has been a computationally inexpensive method for computing range images in near real time by cross-correlating stereo images.

STATEMENT OF THE INVENTION

Apparatus for a near real-time stereo vision system for use with a robotic vehicle comprises two cameras mounted on three-axis rotation platforms, image-processing boards, and a CPU programmed with specialized stereo vision algorithms. Bandpass-filtered image pyramids are computed, stereo matching is performed by least-squares correlation, and confidence images are estimated by means of Bayes' theorem.

In particular, Laplacian image pyramids are built and disparity maps are produced from the 60×64 level of the pyramids at rates of up to 2 seconds per image pair. All vision processing is performed by the CPU board augmented with the image processing boards.

In accordance with the present invention, near real-time stereo vision apparatus for use with a robotic vehicle comprises a first videocamera attached to mounting hardware for producing a first video output image responsive to light from an object scene and a second videocamera also attached to the mounting hardware for producing a second video output image responsive to light from the object scene; a first digitizer for digitizing the first video image having an input connected to an output of the first videocamera, and having an output at which digital representations of pixels in the first video image appear, and a second digitizer for digitizing the second video image having an input connected to an output of the second videocamera, and having an output at which digital representations of pixels in the second video image appear; a videoprocessor for successively producing sequential stereo Laplacian pyramid images at left and right stereo outputs thereof from the digital representations of the first and second video images at first and second inputs connected to the outputs of the first and second digitizers; a stereo correlation means for correlating left and right stereo Laplacian pyramid images at the left and right stereo outputs of the videoprocessor, said stereo correlation means having an output and having first and second inputs connected to the left and right inputs of the videoprocessor; and a disparity map calculator connected to the output of the stereo correlation means for calculating a disparity map of the object scene and having storage for storing an array of numerical values corresponding to the stereo disparity at each pixel of a digital representation of the object scene.

The novel features which are characteristic of the invention will be better understood from the following description in connection with the accompanying drawings. It should be appreciated, however, that each of the drawings is given for the purpose of illustration and description only and that the drawings are not intended to be a definition of the limits of the present invention.

DETAILED DESCRIPTION OF THE INVENTION

The present invention formulates stereo as a statistical estimation problem by using correlation-type operators to estimate the disparity field and associated uncertainty models, and by using fast, simple optimization algorithms. Considerable background information of use in practicing the invention is contained in the paper "Stereo vision for Planetary rovers: Stochastic modeling to near real-time implementation" by Larry Matthies, published in Proc. SPIE Conference 1570, Geometric Methods in Computer Vision, SPIE, July, 1991 (also available as technical report JPL D-8131, January 1991). That paper by Matthies is hereby incorporated herein by this reference.

Figure 1:
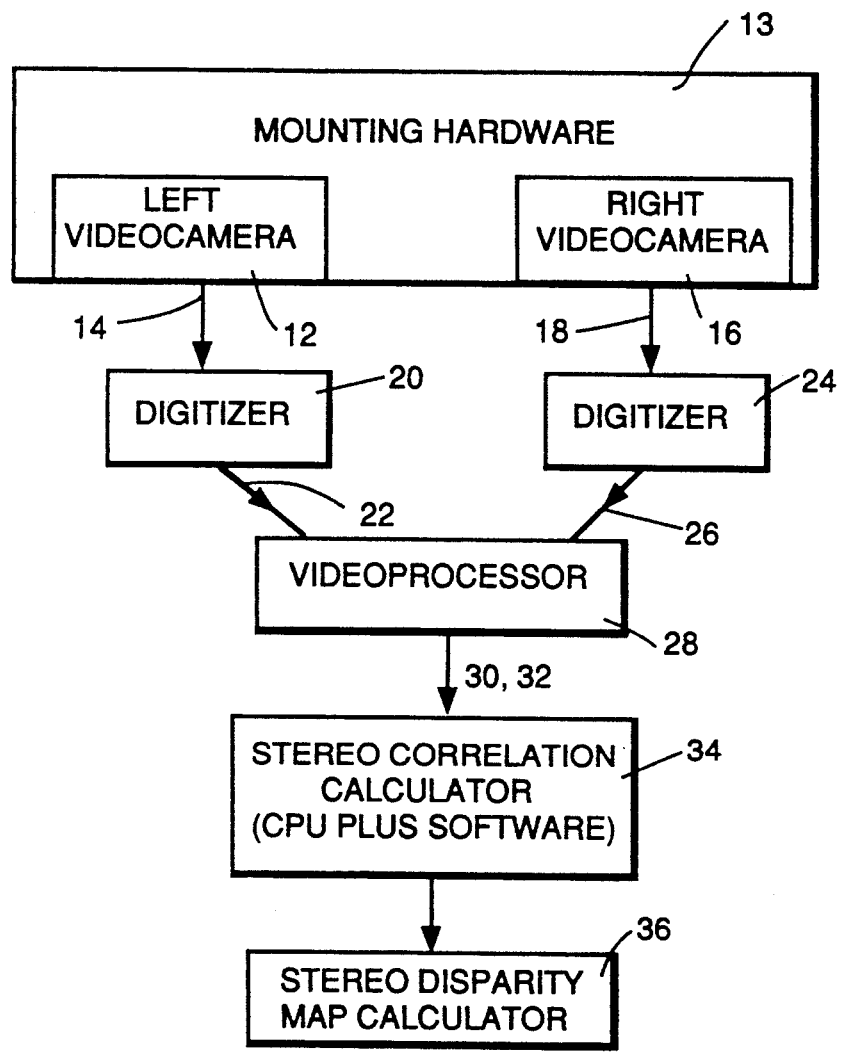
FIG. 1 is a block diagram of the near real-time stereo vision system of the present invention.

Referring to FIG. 1, near real-time stereo vision apparatus for use with a robotic vehicle comprises a first videocamera 12, attached to mounting hardware 13, for producing a first video output image 14 responsive to light from an object scene; a second videocamera 16, also attached to mounting hardware 13, for producing a second video output image 18 responsive to light from the object scene; a first digitizer 20 for digitizing the first video image 14, having an input connected to an output of the first videocamera 12, and having an output at which digital representations 22 of pixels in the first video image 14 appear, and a second digitizer 24 for digitizing the second video image 18, having an input connected to an output of the second videocamera 16, and having an output at which digital representations 26 of pixels in the second video image 18 appear; a videoprocessor 28 for successively producing sequential stereo Laplacian pyramid images 30 and 32 at left and right stereo outputs thereof from the digital representations 22 and 26 of the first and second video images 14 and 18, having first and second inputs connected to the outputs of the first and second digitizers 20 and 24; a stereo correlation calculator 34 for correlating left and right stereo Laplacian pyramid images 30 and 32 at the left and right stereo outputs of the videoprocessor 28, having an output and having first and second inputs connected to the left and right outputs of videoprocessor 28; and a disparity map calculator 36 connected to the output of stereo correlation calculator 34 for calculating a disparity map of the object scene, said disparity map calculator 36 having storage for storing an array of numerical values corresponding to the stereo disparity at each pixel of a digital representation of the object scene.

The cameras and videoprocessing and computational hardware needed for the present invention are commercially available. For example, the videocameras can both be either Hitachi model KP-140 or Hitachi KP-180. The Hitachi HP-180 is shuttered for 1/600th of a second, which helps to minimize problems associated with camera movement. The mounting hardware 13 is of conventional design, including two three-axis rotation platforms, designed so that first and second videocameras 12 and 16 can be adjustably mounted on a robotic vehicle or the like with parallel optical axes and appropriate roll about the optical axis.

The following videoprocessing boards, available from Datacube, can be used for the videoprocessor 28 to practice the invention: Digimax boards (two needed), a Framestore board, ROI Store 2048 boards (two needed), a VFIR Mk II board, and a Max-SP Mk I board. The stereo correlation calculator 34 is implemented with a central processing unit (CPU) programmed to execute an algorithm that will effect the required computations. For the central processing unit a Heurikon CPU board, which is based on a Motorola 68020 microprocessor, can be used. Alternatively, a CPU board based on the 68040 chip is available from the Radstone Company.

Three of the most important practical issues arising in the implementation of the stereo vision system of the present invention concerned orienting the cameras to align scanlines for efficient matching, dealing with local bias and contrast differences between the two images, and optimizing the algorithms to obtain near real-time speed with modest computing hardware.

If a plane is formed from the focal points of the two videocameras and a given object point, the intersections of that plane with the image planes of the videocameras are known as "epipolar lines." A "scanline" is a row of pixels in the video image. Stereo matching is most efficient and easiest to implement when corresponding epipolar lines are also corresponding scanlines of the two images. Nominally, such alignment can be achieved by orienting videocameras 12 and 16 with parallel optical axes and with appropriate roll about the optical axes.

A quick and convenient procedure for achieving approximate alignment is obtained by mounting videocameras 12 and 16 on three-axis rotation platforms mounting hardware 13 and using an alignment target as a guide for manual adjustment of the platforms. In the alignment procedure, both cameras view the target while Datacube image processing boards subtract and display the images at frame rates. The alignment target has horizontal stripes, plus vertical stripes with the same spacing as the stereo baseline. Thus, when the cameras are properly aligned the stripes will overlay each other perfectly on the subtracted image. The cameras can be aligned very quickly by adjusting the rotation platforms while watching the display.

Since focus affects the size of the image, it is also necessary to adjust focus so that the images have the same size. Imperfect optics and compromises made during the alignment procedure may actually leave the cameras focused at different distances; however, this is less of a problem than different image sizes and can be accommodated easily as described below.

Any remaining misalignment is compensated by performing stereo matching with low-resolution 60×64 images from the image pyramids. These low-resolution images effectively have a "larger" pixel size than the original 480×512 image, making them less sensitive to epipolar misalignment. If wide-angle lenses are used, the images may also have significant curvature from fish-eye distortions. This has been avoided by using 16-mm lenses, giving a field of view of about 30 degrees.

Applying stereo algorithms in the correlation calculator 34 to the original intensity image from the videoprocessor 28 is adequate if there is negligible difference in bias and contrast between the two images; however, if such differences do exist, they may severely distort the disparity images. Possible methods for coping with this problem include the use of normalized or "pseudo-normalized" correlation operators, calibrating the differences and modelling them within the correlator, and high-pass or bandpass filtering the images before stereo matching. The filtering approach, which decreases sensitivity to bias and contrast differences at the cost of potential increase in matching ambiguity, was chosen because it is least expensive to implement and has been found to perform well in practice, as implemented via Laplacian pyramids as described below.

To be practical for use in semi-autonomous navigation, stereo systems must operate in a few seconds per frame or less, using computing hardware that can be carried on a vehicle. A widely used algorithmic approach to the speed problem is to perform stereo matching by coarse-to-fine search with image pyramids. Reducing image resolution by a factor of two reduces the required amount of search by a factor of eight, since half the disparity range is searched for one quarter of the pixels. Also, lowering resolution reduces sensitivity to misfocus and epipolar misalignment between the cameras.

In the preferred embodiment of the invention an original 480×512 image is reduced to 60×64 by computing Laplacian image pyramids in the videoprocessor 28; matching is done at this level without extending the search to higher resolutions. Using Laplacian, as opposed to Gaussian, pyramids reduces bias and contrast problems as noted above.

With processors in the 68020 class, efficient pyramid-based algorithms alone are not sufficient to reach real-time speeds. For increased speed, the present invention uses special-purpose convolution hardware to assist pyramid creation and cross-correlation, implemented in a VME card cage with a 68020-based CPU board and a set of image processing boards manufactured by Datacube. The Datacube image processing hardware includes two digitizers, an 8×8 by 8-bit convolver, an ALU board and image memory.

Stereo image pyramids are computed at the rate of six image pairs per second, and all of the remaining stereo computation is performed by the 68020-based CPU. It is assumed that the epipolar alignment is adequate to allow the search for stereo matches to be strictly one-dimensional within corresponding scanlines. The sum-of-squared-differences (SSD) correlation is computed at pixel offsets by the efficient moving average technique, using windows ranging in size from 5×5 up to 11×11 (7×7 is most common).

The noisy nature of sensors implies that any mathematical model of the stereo vision problem will include a statistical component, which is useful in constraining the design of a stereo vision system. The fundamental elements of an estimation problem include the variables to be measured, the measurements available, the mathematical model relating the measurements to the variables of interest, the mathematical model of the uncertainties present, and the performance evaluation criterion to judge which estimation algorithms are "best."

In a field-based model, the variables are the stereo disparity at each pixel in the image. Assuming the images are obtained with ideal epipolar geometry, the disparity is a scalar giving the horizontal displacement of matching pixels in the two images. For static stereo matching (i.e. no-motion model), the most basic measurements are the intensities themselves, and the simplest model relating these to the variables of interest (disparity) is the equation $$I_l(x,y)=I_r(x-d(x,y), y)+n(x,y),$$

where $I_l$ and $I_r$ denote the left and right images, d is the disparity, and n models noise. The preferred embodiment actually uses as measurements the differences of intensity between the two images in small windows around the pixel. In reality, many other factors can come into the measurement model besides additive image noise, including geometric and photometric image distortions and aspects of surface reflectance models, but the invention uses pragmatic methods to compensate for these effects without explicitly modeling them.

The uncertainty model includes both a probabilistic model of the noise n and a probability distribution that models prior knowledge of the disparity field d(x,y). In stereo and surface interpolation, Markov random fields have been used to model surface smoothness constraints imposed on the estimated disparity field. Alternatively, the prior distribution may model prior information available about the disparity at each pixel, such information coming from processing previous images or from other sources.

Prior probabilistic models models can be classified according to whether the disparity field is modelled as totally uncorrelated (0-D modelling), correlated in one dimension, say within scanlines (1-D), or correlated in both dimensions. The degree of correlation affects the difficulty of the estimation problem. The present invention makes use of the uncorrelated and one-dimensional cases. In the uncorrelated case, posterior probabilities can be derived that provide valuable confidence estimates and may be useful for performance evaluation purposes.

For both the 0-D and joint 1-D algorithm, posterior probabilities are estimated as described further below, using table look-up to compute the exponential functions for the Gaussian distributions. For efficiency, sub-pixel disparity estimates are obtained by fitting parabolas to the three SSD values surrounding the disparity estimates obtained at pixel resolution.

The entire system computes range images from the $60\times64$ level of the pyramid in approximately two seconds per frame for the 0-D algorithm and three to four seconds for the 1-D algorithm. Much of the SSD calculation could also be done by the Datacube boards, and it is estimated that this would bring the time per frame to well under one second for the 0-D algorithm and under three seconds for the 1-D algorithm, Additional speed-up could be obtained by upgrading the CPU.

CALCULATING THE LAPLACIAN IMAGE PYRAMIDE

Figure 2:
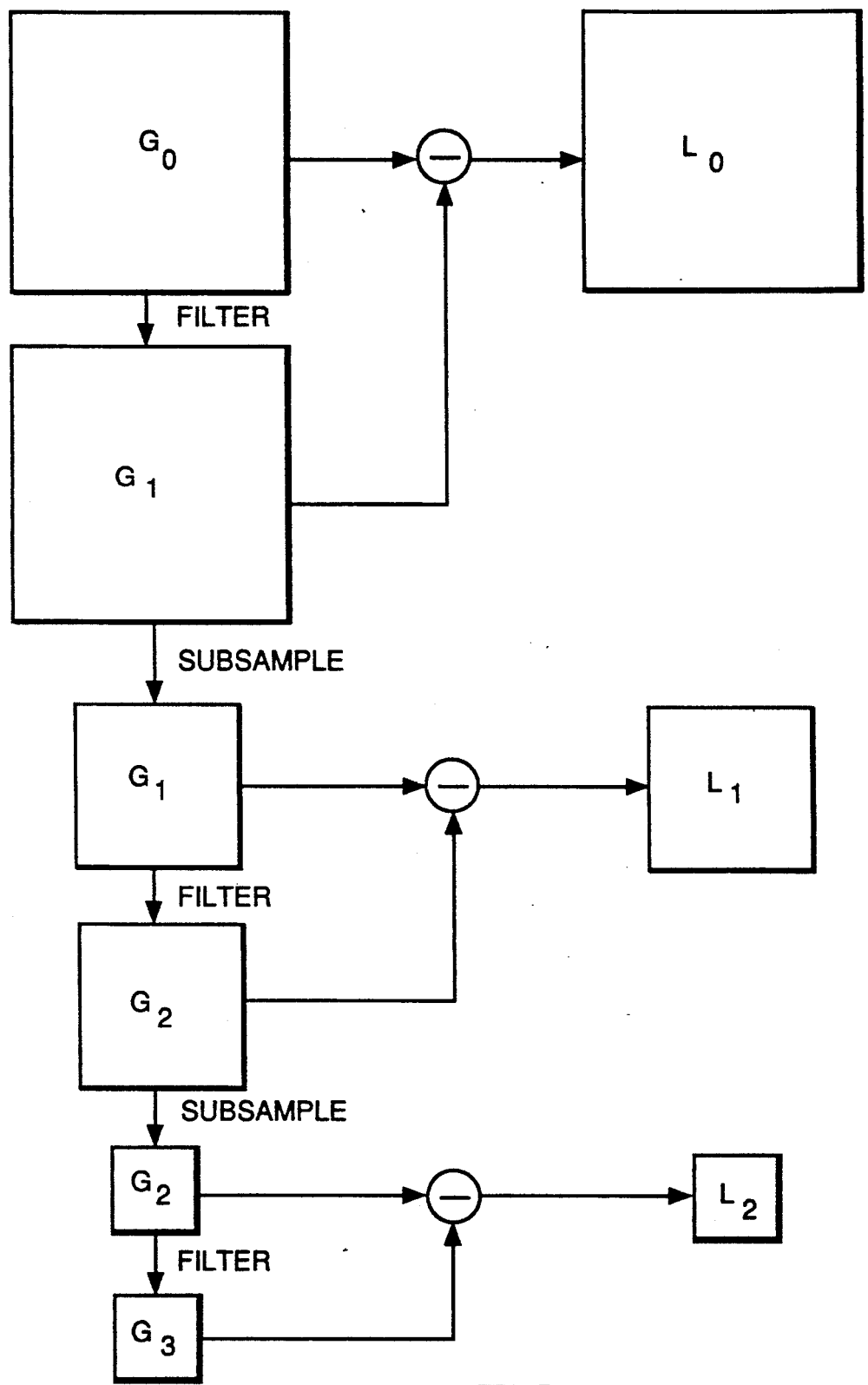
FIG. 2 is a block diagram illustrating the calculation of Laplacian image pyramids.

Referring to the flow diagram shown in FIG. 2, an input image $G_0$ in the form of a digitized array is received by the videoprocessor 28. There it undergoes a low-pass filtering operation to produce an image $G_1$ which is then subtracted from $G_0$ to leave an image $L_0$ which retains the high-frequency information of the original image. The bandpass image $L_0$ is called a "Laplacian" image which has the low frequencies removed.

Next the blurred image $G_1$ can be "subsampled," as shown in FIG. 2, by taking every other pixel in every other line to reduce the total number of pixels in the image by a factor of four. The subsampled image $G_1$ is then lowpass-filtered to produce a filtered image $G_2$ which is subtracted from $G_1$ to give a reduced Laplacian image $L_1$. Similarly, $G_2$ can be subsampled and filtered to produce an even smaller Laplacian image $L_2$. Further recursion gives Laplacian images $L_3$, $L_4$, and so forth.

In the preferred embodiment of the present invention two $480\times512$ images are used to generate Laplacian pyramids in stereo. $L_3$ in the present case is thus an $60\times64$ pixel image, and is used to reduce the computational time required for the stereo vision system and to obviate various alignment and nonuniformity problems.

U.S. Pat. No. 4,718,104 to Charles H. Anderson describes a filter-subtract-decimate hierarchical pyramid signal analyzing and synthesizing technique similar to that used in the present invention. That patent is hereby incorporated herein by this reference.

In terms of the inverse of the frame rate of the video cameras employed, namely 1/30 second, the following sequence of events occurs: during the first frame the stereo pair $(G_0)_{left}$ and $(G_0)_{right}$ are acquired, during the second frame $(L_0)_{left}$ and $(G_1)_{left}$ are calculated, during the third frame $(L_0)_{left}$ and $(G_1)_{right}$ are calculated, and during the fourth frame and subsequently the remaining little images of the pyramid are calculated.

Figure 3:
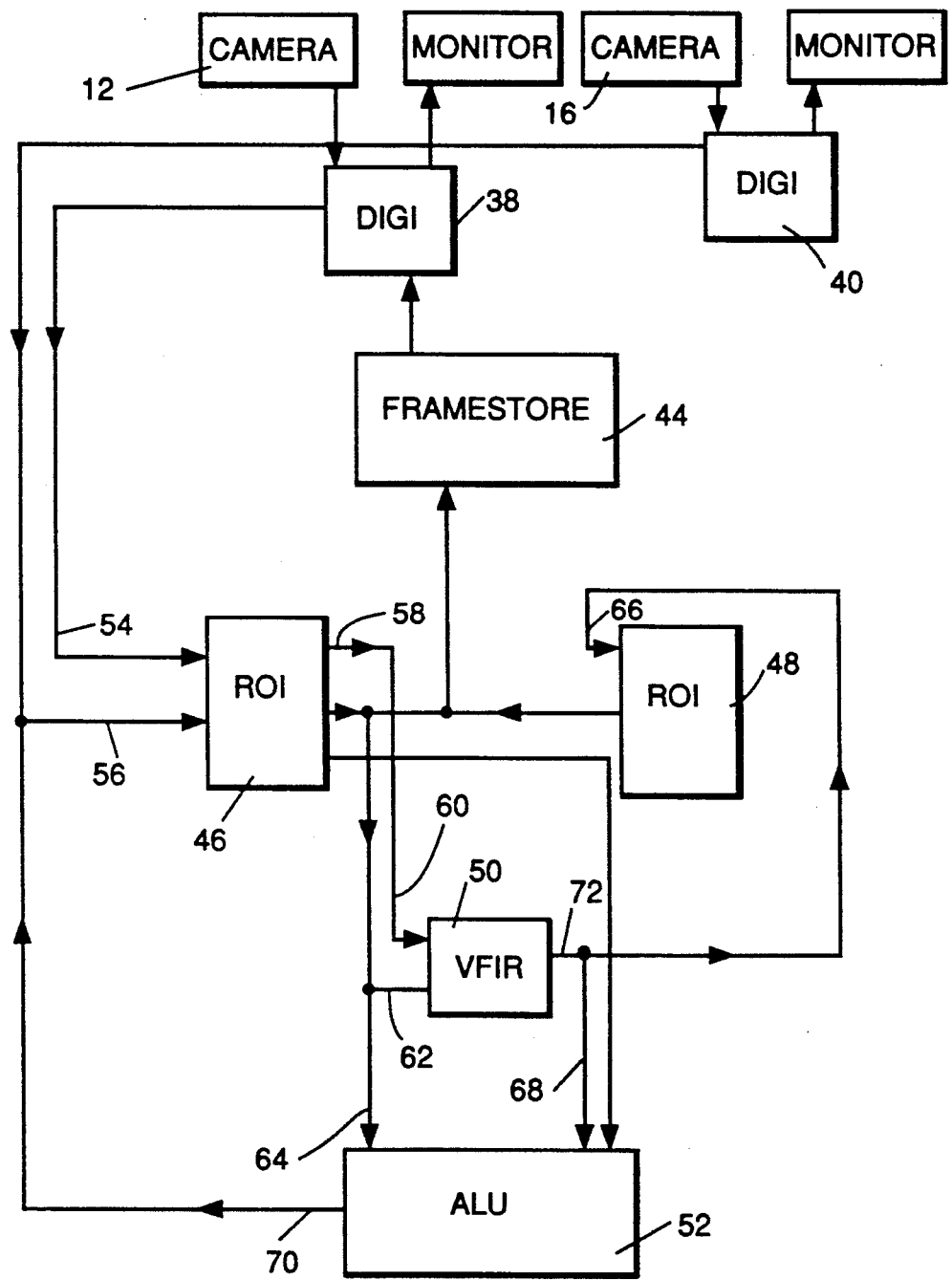
FIG. 3 is a block diagram of the hardware implementation of the stereo Laplacian image pyramids.

As shown in FIG. 3, the algorithm for calculating Laplacian image pyramids was implemented by Datacube imaging processing VME boards: two A/D digitizer boards 38 and 40 for the stereo pair, a frame store board 44 for storing three frames, two region-of-interest eight-frame store boards 46 and 48 for doing the subsampling or "decimation," a video finite impulse response (VFIR) board 50 capable of lowpass filtering at video rates, and a general purpose arithmetic and logic unit (ALU) board 52 for doing the necessary subtractions. All lines interconnecting the blocks representing the image processing boards in FIG. 3 correspond to 8-bit data lines running at 10 Mbytes/second.

During frametime 1, digital output signals representing the stereo image pair are sent from first and second digitizer boards 38 and 40 via data buses to first and second inputs 54 and 56 of first ROI board 46, where the images are stored. During frametime 2, image $(G_0)_{left}$ is read out of first ROI board 46 through output 58 and fed into input 60 of VFIR board 50 where it is lowpass filtered to become $(G_1)_{left}$. A delayed version of $(G_0)_{left}$ is sent on through output 62 to input 64 of ALU board 52. $(G_1)_{left}$ is simultaneously sent to input 66 of second ROI board 48 and input 68 of ALU board 52. In ALU board 52 $(G_1)_{left}$ is subtracted from the suitably delayed version of $(G_0)_{left}$ entering input 64. The difference $(L_0)_{left}$ leaves through output 70 and goes to input 56 of first ROI board 46. $(G_1)_{left}$ is also sent through output 72 of VFIR board 50 and goes to input 66 of second ROI board 48 where it is sampled. During frametime 3, $(G_0)_{right}$ is read out of first ROI board and through a sequence of events identical to that just described becomes $(G_1)_{right}$ and $(L_0)_{right}$.

In successive frametimes the signals $(G_{n+1})_{left}$ and $(L_n)_{left}$ are generated from $(G_n)_{left}$ and the signals $(G_{n+1})_{right}$ and $(L_0)_{right}$ are generated from $(G_n)_{right}$ in a manner identical to that described above for $G_1$ and $L_0$.

A listing in the computer programming language "C" for the pyramid calculating algorithm is given in Appendix A.

Figure 4:
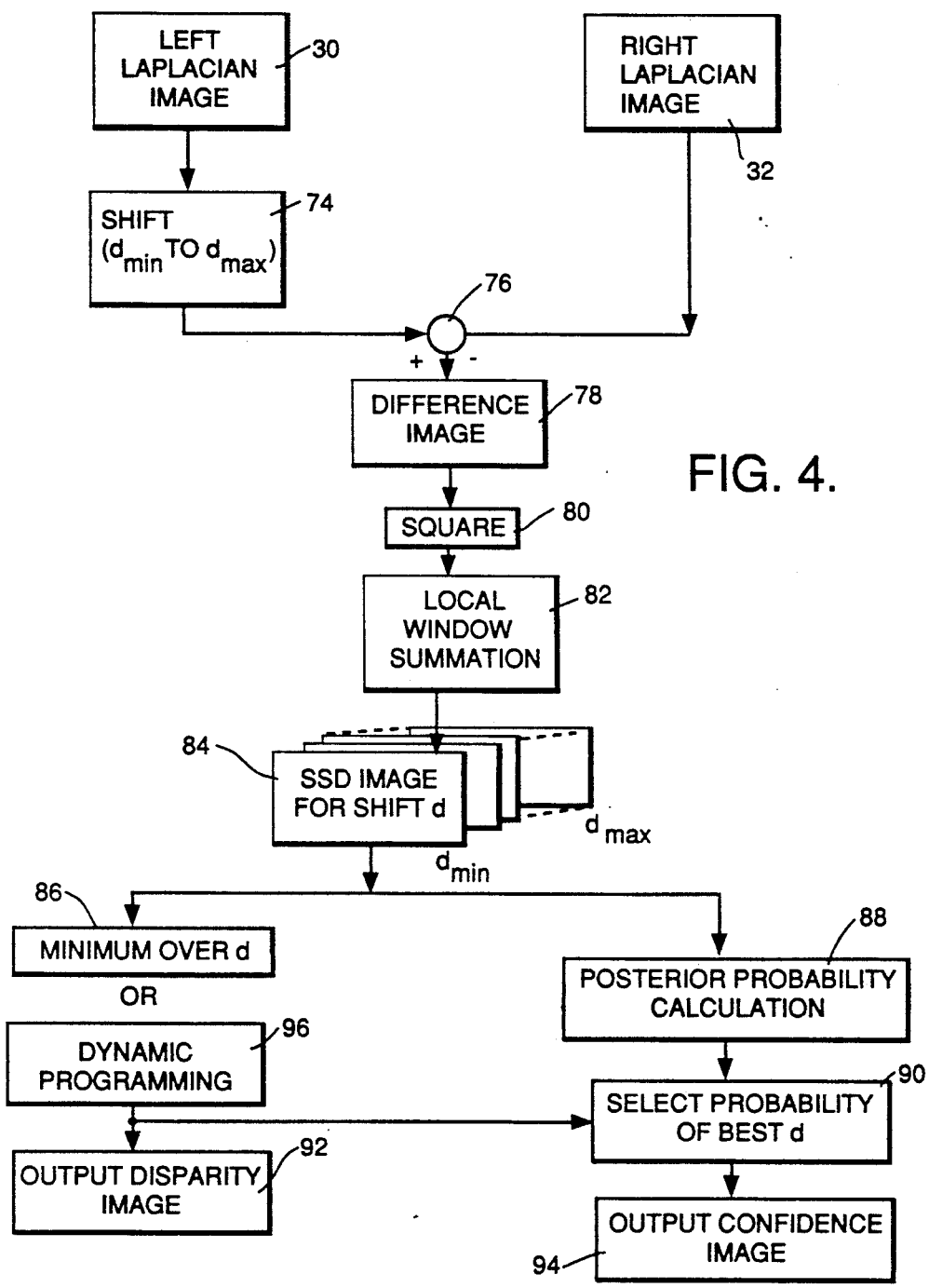
FIG. 4 is a flow diagram of the stereo correlation algorithm.

Referring to FIG. 4, the stereo correlation algorithm begins with the left and right Laplacian pyramid images 30 and 32 produced by videoprocessor 28 operating on the digitized signals 22 and 26. The left image 30 undergoes a shift procedure 74 over a selected range of disparity values from $d_{min}$ to $d_{max}$ and the right image 32 is subtracted from the shifted images in an operation 76 to give difference images 78. The individual pixel values of a particular difference image 78 undergo squaring 80 and summation 82 over a local window of predetermined width. This produces sum-of-squared-differences (SSD) images 84 for each value of shift d (from $d_{min}$ to $d_{max}$). See, for example, a paper by P. Anandan titled "Computing dense displacement fields with confidence measures in scenes containing occlusion," published in Proc. of DARPA Image Understanding Workshop, pp. 246-246, SAIC, 1984. For each pixel, the minimum SSD over all d is found in minimization procedure 86 and simultaneously a posterior probability calculation 88 is carried out. The results of 86 and 88 are used in selection 90 of the probability of the best d. The SSD minimization 86 over d is used in the outputting 92 of the disparity image, and the selection 90 of the probability of the best d is used in the outputting 94 of the confidence image.

Alternatively, the functional block representing minimization 86 over d can be replaced with a block representing dynamic program optimization 96.

MAXIMUM LIKELIHOOD MODEL

The left ($I_l$) and right ($I_r$) images of a stereo pair are modelled as displaced versions of the same deterministic signal with noise added to each image. Thus, $$I_l(x) = I(x) + n_l(x)$$

$$I_r(x) = I(x + d(x)) + n_r(x)$$

where I is the underlying deterministic signal, d is the displacement or "disparity" between images $I_l$ and $I_r$, and $n_l$ and $n_r$ model the noise in each image as stationary, Gaussian white sequences with zero means and variances $\sigma_l^2$ and $\sigma_r^2$, respectively.

Maximum likelihood estimation is appropriate when the disparity is treated as a deterministic, unknown parameter. Using this method requires defining a set of measurements as functions of the unknown disparity, formulating the probability density of the measurements conditioned on the disparity, and determining the disparity estimate that maximizes the probability of the measurements. As measurements, the intensity differences between the two images in small windows around the pixels being matched are used, or more generally, the differences of a set of linear filters applied to each image. Thus, to estimate the disparity at pixel $I_1(x_0)$, assuming that disparity is constant over a small window around $x_0$, the measurements are the intensity errors $$e(x_0 + \Delta x_i; d) = I_r(x_0 + \Delta x_i - d) - I_1(x_0 + \Delta x_i)$$

where $\Delta x_i$ indexes pixels in the window. The measurements $e(x_0 + \Delta x_i; d)$ are expressed together as the vector $$\underline{e}(x_0; d) = [e(x_0 + \Delta x_i; d), \ldots, e(x_0 + \Delta x_n; d)]^T$$

where n is the size of the window. To simplify the notation in what follows, e will generally be written without the indices. Under the noise model described above, the joint probability density function of e is $$f(\underline{e}|d) = [(2\pi)^{-n/2}\sigma^{-1}]\exp\{-(\tfrac{1}{2}\sigma^2)\underline{e}^T\underline{e}\}, \qquad (1)$$

where $\sigma^2 = \sigma_l^2 + \sigma_r^2$ is the sum of the noise variances in both images. A maximum likelihood disparity estimate maximizes Equation (1), which is equivalent to minimizing the quadratic form $e^T e$ in the exponent, the familiar "sum of squared differences" or SSD matching criterion.

For digital images, disparity is estimated in two steps. First, $e^T e$ is evaluated for every discrete d in a predefined search range to find the minimum to a pixel level of resolution. This yields an initial estimate $d_0$ of d at pixel resolution. Estimates to subpixel resolution can be obtained in many ways. Though not the most computationally efficient approach, linearization (taking the first-order expansion of e about $d = d_0$) is instructive; it yields $$e(x_0 + \Delta x_i; d) = I'_r(x_0 + \Delta x_i)(d - d_0) + n_r(x_0 + \Delta x_i - d_0) - n_1(x_0 + \Delta x_i).$$

Since the noise terms are modeled as stationary, the last two terms can be abbreviated to $n(x_0 + \Delta x_i)$, the variance of which is $\sigma^2$. Collecting all $e(x_0 + \Delta x_i; d)$, $I'(x_0 + \Delta x_i)$, and $n(x_0 + \Delta x_i)$ into the vectors e, J, and n yields $$\underline{e} \approx \underline{J}(d - d_0) + \underline{n}$$

For implementation, the derivatives $I'$ are estimated from $I_1$. Since $I_1$ is noisy, the derivative estimates will also be noisy; this can be moderated by smoothing the image before differentiation.

With the linearized model of e, the conditional density of e is $$f(\underline{e}|d) \alpha \exp\left(-\frac{1}{2\sigma^2}[\underline{e} - \underline{J}(d - d_0)]^T[\underline{e} - \underline{J}(d - d_0)]\right)$$

Taking the log of this and setting the derivative with respect to d to zero, the disparity estimate is obtained $$\hat{d} = d_0 + \frac{\underline{J}^T\underline{e}}{\underline{J}^T\underline{J}}$$

This can be iterated to refine the estimate. In practice, iterating will require estimating the intensity errors e at positions between pixels. This can be done by fitting curves to the discrete intensity image.

The uncertainty in the disparity estimate is expressed by the variance of the estimation error, $E[d^2] = E[d - \hat{d})^2]$. Assuming $\hat{d}$ is unbiased ($E[\hat{d}] = d$), standard error propagation techniques lead to the following estimate of the error variance:

$$E[\hat{d}^2] = \frac{\sigma^2}{J^T J} \equiv \sigma_d^2 \quad (2)$$

This expression is actually a lower bound on the error variance.

Note that the variance $\sigma_d^2$ relates the precision of the disparity estimate to the noise level $\sigma^2$ and the "edginess" of the images, as expressed by the squared intensity derivatives $J^T J$, as well as to the number of pixels in the window. The intensity derivatives needed to estimate $\sigma_d^2$ can be computed from $I_1$ before attempting to match, so the variance estimate can be used as an "interest operator" to decide where matching should be attempted. In fact, $\sigma_d^2$ is essentially the inverse of the so-called Moravec interest operator. Note that the use of linearization to derive $\sigma_d^2$ makes it a local measure of precision around the chosen optimum of $e^T e$; therefore, it does not reflect the possibility of match ambiguity should there be multiple, nearly equivalent local optima. This possibility is reflected in posterior probability estimates derivable from Bayesian formulations of stereo, as discussed below.

Next, although the estimated disparity field has been modeled as uncorrelated, disparity estimates for pixels separated by distances $\tau \leq w$, where w is the width of the matching window, actually will be correlated because of the overlap in the windows used to compute the estimates. (The presence of correlated noise in the images would also induce correlation in the disparity estimates.) This point is relevant to the joint 1-D formulation discussed below. It is also relevant when analyzing the uncertainty of surface slope estimates obtained by subtracting range estimates from adjacent pixels. In this case, the correlation in the range estimates will tend to reduce the relative range error between the two pixels; consequently, it will also reduce the variance of the slope estimates.

Finally, the zero-mean, stationary, white, Gaussian noise model used here is convenient analytically, but it has shortcomings in practice. In particular, real stereo image pairs tend to have local differences in mean intensity and in contrast. In the implementation described below, this is dealt with by bandpass filtering the images before matching.

BAYESIAN ESTIMATION

Bayesian estimation is appropriate when probabilistic prior information is available about the disparity field. Most often this information has taken the form of prior smoothness models for the disparity field in surface interpolation problems, where the smoothness model can be cast as a prior probability distribution. Another possibility that is less commonly noted but very powerful is that there may be prior disparity estimates at each pixel. This can arise in "bootstrap" approaches to stereo where a narrow-baseline image pair is used to constrain matching of a wide-baseline pair. Even when no explicit smoothness models are used and the only prior disparity information is a single, global search interval, Bayesian models can be used to derive practical models of the posterior probability distribution for the disparity field, at least in the "0-D" case. Such distributions are useful in characterizing the uncertainty in disparity estimates. They may also provide a quantitative performance metric for comparing the effectiveness of alternate stereo algorithms, such as the relative effectiveness of using color versus greyscale images. These issues for 0-D models and joint 1-D Bayesian models are considered below.

In the following, the conditional probability density function $f(e|d)$ of the measurements e, given disparity d, will continue to be used. This invention is concerned only with discrete disparities (i.e., pixel resolution), so probabilistic information about disparity will be modeled by discrete distributions with probability functions $f(d)$. Thus, for disparity estimation at individual pixels, Bayes, theorem gives the posterior probability of the disparity d, given the measurements e, as in a Ph.D. dissertation by D. B. Gennery titled "Modeling the environment of an exploring vehicle by means of stereo vision," Stanford University, June 1980:

$$f(d|e) = \frac{f(e|d)f(d)}{\Sigma_i f(e_i|d_i)f(d_i)} \quad (3)$$

where $f(d)$ is the prior p.f. of $d_i$, i indexes the range of possible disparities, and the conditional density $f(e|d)$ is as in Equation (1). Optimal estimates of d by the maximum posterior probability (MAP) criterion will now be defined. For a given set of measurements, the denominator is a constant normalizing term that is not needed to obtain the MAP estimate, though it is needed to determine the actual posterior probabilities. It is assumed that any prior information about d comes from external sources, such as previous images, a laser scanner, or a map database, and is independent of the image noise.

When the only disparity information available is a minimum and a maximum disparity limit, it is reasonable to model the prior distribution as uniform over this interval, as in the Ph.D. dissertation by D. B. Gennery referred to above and incorporated herein by reference. In this case, the prior distribution cancels in Equation (3) leaving only a constant normalizing term in the denominator:

$$f(d|\underline{e}) = \frac{f(\underline{e}|d)}{\Sigma_i f(\underline{e}|d)} \alpha f(\underline{e}|d). \quad (4)$$

Thus, in this case, the MAP and the ML disparity estimates are the same and are obtained by minimizing the squared error criterion $e^T e$. However, the Bayesian formulation also provides a posterior probability for each possible (discrete) disparity obtained simply by performing the normalization in Equation (4). This can be done efficiently by using table look-up to evaluate the exponential function in the Gaussian model for $f(e|d)$ as done in the Ph.D. dissertation by D. B. Gennery. A posterior variance estimate can be obtained by computing the second moment of the posterior distribution about its mean, as also done in the Ph.D. dissertation by D. B. Gennery, or it can be approximated via the linear error propagation used earlier.

How can the posterior probability distribution be interpreted? First, the probability of the MAP estimate can be thresholded to determine whether there is sufficient confidence in the disparity estimate to accept it. This is done in the preferred embodiment of the invention. Low probabilities for the MAP estimate can signify that the posterior distribution has a broad, low peak, because the pixel is in a textureless area of the image, or that the posterior distribution has multiple peaks due to matching ambiguity. In principle, these cases can be distinguished; for example, by also examining the variance estimate/interest operator described earlier. In the case of ambiguity, other techniques could be invoked to resolve the ambiguity, such as surface smoothness criteria or exploratory camera motions In the present invention, the only action performed is acceptance or rejection of the estimate based on a probability threshold If a more informative distribution is available than the uniform distribution, the required course of action depends on how the prior is modeled If the prior is tabulated as a discrete probability function, the numerator of Equation (3) for each possible disparity may be evaluated and the disparity estimate may be chosen as that $d_i$ which maximizes the numerator. The posterior probabilities would be obtained as before by normalizing by the sum in the denominator. Rather than a discrete tabulation, the prior may be modeled as a continuous p.d.f. at each pixel. In particular, if the prior is modeled as a Gaussian density with mean $d^-$ and variance $s^-$, $$f(d) \alpha \exp\left(-\frac{1}{2}\frac{(d-\hat{d}^-)^2}{s^-}\right),$$

then the MAP estimate to pixel resolution may be obtained by maximizing the log-likelihood $$l(d) = \ln f(d|\underline{e}) = -\frac{1}{2}\left(\frac{1}{\sigma^2}\underline{e}^T\underline{e} + \frac{(d-\hat{d}^-)^2}{s^-}\right) + K, \quad (5)$$

where is a constant, or equivalently by minimizing the expression in braces. This expression is just a combination of the intensity error term from before, weighted by the inverse noise variance, with a quadratic penalty for deviation from the prior estimate, weighted by the variance of the prior estimate. Intuitively, the local minima of $(1/\sigma^2)e^T$ can be viewed as defining candidate disparities and the penalty term as influencing which candidate is considered optimal.

Sub-pixel disparity estimates can be obtained by earlier. Furthermore, for nonuniform prior distributions, one can derive a posterior mean and variance that represent the optimal combination of information from the prior distribution and measurements from the new images.

JOINT 1-D MODEL AND ALGORITHM

The previous section modeled the disparity field as uncorrelated and then described algorithms for estimating the disparity independently at each pixel. These algorithms are very simple and efficient, and they have been found to be very effective in indoor and outdoor operation. Indeed, this approach was motivated in part by arguments made by Nishihara in a paper titled "Practical Real-Time Imaging Stereo Matcher," published in the September/October 1984 issue of Optical Engineering, volume 23, number 5, that simplicity is important in stereo vision systems. In contrast, more complex approaches involve the use of explicit surface smoothness models and more global optimization methods.

Smoothness models can improve reliability, as surface interpolation can be used to fill in gaps in the estimated disparity field. Usually two-dimensional surface models that impose constraints both within and across scanlines are employed. Unfortunately, this leads to objective functions for which it is very difficult to find the global optimum.

A compromise approach models only one-dimensional interactions within each scanline. This is referred to as "joint 1-D" modeling, because joint estimators are derived for the vector d of disparity across an entire scanline A statistical approach is taken by deriving the estimators as extensions of the Bayesian model discussed above. Two models are developed for the prior probability distribution of d, one of which is a 1-D specialization of the membrane smoothness model, and one of which is a new model that assumes the existence of prior disparity information at each pixel. The MAP criterion is again employed to define the optimal disparity vector d and show that, within each scanline, the globally optimal estimate can be found by dynamic programming. The resulting algorithms are relatively fast, perform very well, and can be applied independently and in parallel to each scanline.

To derive the model, the joint version of Bayes' theorem is written as $$f(\underline{d}|\underline{e}) = \frac{f(\underline{e}|\underline{d})f(\underline{d})}{\Sigma_i f(\underline{e}|\underline{d}_i)f(\underline{d}_i)}.$$

The measurement vector e now includes measurements for all pixels across the scanline. For illustration, we will first recast the results of the previous section in terms of the joint model. For simplicity, suppose that in matching each pixel intensity differences at only that pixel are used. Then for each pixel $I(x_i)$ the measured intensity error is $$e(x_i;d_i) = I_T(x_i - d_i) - I_1(x_i),$$

where $d_i$ is the disparity at $x_i$. The vector of measurements over the entire scanline is $$\underline{e}(\underline{x};\underline{d}) = [e(x_i;d_i), \ldots, e(x_N;d_N)]^T$$

where N is the length of the scanline Dropping the indices on e; its joint p.d.f. is $$f(\underline{e}|\underline{d}) = \Pi_i f(e_i|d_i) = \frac{1}{(2\pi)^{N/2}\sigma} \exp\left(-\frac{1}{2\sigma^2}\underline{e}^T\underline{e}\right). \quad (6)$$

Since the disparity field was modeled as uncorrelated, the joint prior distribution f(d) is just the product of the individual distributions for each pixel, $$f(\underline{d}) = \Pi_i f(d_i),$$

which for the Gaussian case is $$f(\underline{d}) = (2\pi)^{-N/2}\left|\Pi_i \sigma_i^-\right|^{-1}\exp\left(-\frac{1}{2}\Sigma_i\frac{(d_i-\hat{d}_i^-)^2}{s_i^-}\right) =$$

$$(2\pi)^{-N/2}|W_d^-|^{1/2}\exp\left(-\frac{1}{2}[\underline{d}-\hat{\underline{d}}^-]^T W_d^-[\underline{d}-\hat{\underline{d}}^-]\right),$$

with $W_d^-$ being the diagonal inverse covariance matrix $W_d^- = [\text{diag}(s_1^-, \ldots, s_N^-)]^{-1}.$ The posterior distribution is $$f(\underline{d}|\underline{e}) \propto f(\underline{e}|\underline{d}) f(\underline{d}) = \prod_i f(e_i|d_i) f(d_i).$$

The MAP estimate is obtained by taking the log of this expression and finding the vector d that maximizes the result. Because the log-probability is a sum of terms like Equation (5), the optimal d is obtained by choosing the estimates for each pixel independently One class of models in which the inverse prior covariance matrix $W_d^-$ is not diagonal arises from regularization-based approaches to stereo vision and surface interpolation. The original motivation for these approaches came from physical models of surface smoothness constraints, wherein penalty terms for deviation from smoothness were modeled by the energy of deforming membranes or thin plates. Later, it was recognized that these physically-based models had equivalent formulations as Bayesian estimation problems, where the deformation energy was modeled by a prior probability distribution. Specifically, when the issue of discontinuities is ignored, regularization-based penalty functions are equivalent to modeling the disparity field as a zero-mean, stationary random field. This equivalence for a 1-D version of the membrane model regularizer will now be demonstrated, and it will be shown how the MAP estimate for the resulting model can be obtained with dynamic programming.

Following a paper by T Poggio, V Torre, and C. Koch titled "Computational vision and regulation theory," published in Nature, 317(n):314–319, September, 1985, a formulation of stereo with a 1-D membrane model regularizer can be written as the problem of finding the function d(x) that minimizes $$q(d(x)) = \int \{[I_r(x-d)) - I_1(x)]^2 + \lambda (d'(x))^2\} dx. \quad (7)$$

where $\lambda$ is a blending constant The term $(d'(x))^2$ penalizes departures of the estimated disparity field from zero slope; that is, it biases the algorithm to prefer surfaces that face the cameras directly. A discrete version of this formulation is obtained by using differences to approximate d'(x) and writing $$q(\underline{d}) = \left( \sum_{i=1}^N [I_r(x_i - d_i) - I_1(x_i)]^2 \right) + \lambda \left( \sum_{i=1}^{N-1} (d_{i+1} - d_i)^2 \right), \quad (8)$$

so that a cost function is obtained by summing over each pixel in the scanline. With this cost function, the disparity vector $d = [d_1, \ldots, d_N]^T$ that minimizes the total squared intensity error across the scanline plus the weighted, total "deviation from flatness" of d is sought. The second summation is equivalent to the quadratic form $d^T W_m d$, with $$W_m = \begin{bmatrix} 1 & -1 & 0 & \ldots & 0 & 0 \\ -1 & 2 & -1 & \ldots & 0 & 0 \\ 0 & -1 & 2 & \ldots & 0 & 0 \\ \cdot & \cdot & \cdot & & \cdot & \cdot \\ \cdot & \cdot & \cdot & & \cdot & \cdot \\ \cdot & \cdot & \cdot & & \cdot & \cdot \\ 0 & 0 & 0 & \ldots & -1 & 1 \end{bmatrix} \quad (9)$$

Thus, in 1-D the membrane model penalty term is equivalent to a quadratic form with a tridiagonal coefficient matrix.

To relate this to MAP estimation, one can work back from Equations (8) and (9) to probability distributions. The regularizing term is equivalent to the exponent of a prior distribution model of d as a degenerate Gaussian, with zero mean vector and singular inverse covariance matrix $W_m$. Therefore, minimizing Equation (8) is equivalent to MAP estimation for the Gaussian model with $\bar{d}^- = 0$, $W_d^- = W_m$ and $f(e|d)$ as in Equation (6).

Figure 5:
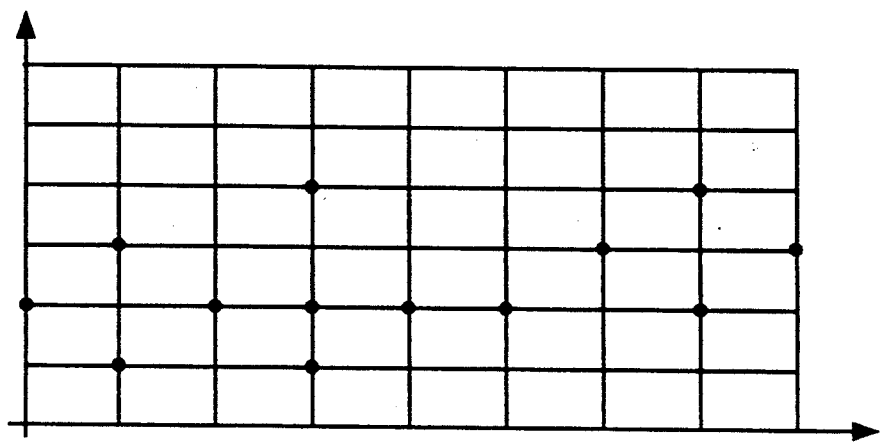
FIG. 5 is a search graph candidate array for a joint 1-D stereo matching algorithm.
Figure 6:
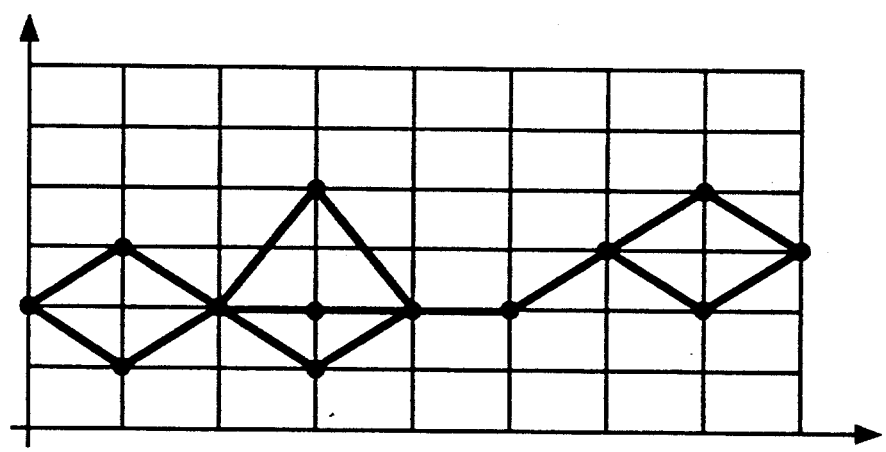
FIG. 6 is the search graph candidate array of FIG. 5 with edges, illustrating the graph structure.

From a practical standpoint, this example is particularly valuable in stereo vision because it is a case in which the MAP estimate for the entire scanline can be computed efficiently by a dynamic programming optimization algorithm. This can be seen by mapping Equation (8) into a problem of finding a minimum-cost path in a weighted, directed graph Vertices of the graph are the possible disparities at each pixel This is shown in FIG. 5, which represents the scanline coordinate on the horizontal axis, the disparity coordinate on the vertical axis, and possible disparities for each pixel as the dots in each column. Edges of the graph join the vertices in adjacent columns, as in FIG. 6 Costs are assigned to the vertices from the intensity error term of Equation (8) and to edges from the squared derivative term. Thus, the value of the entire objective function for any d is obtained by adding the vertex and edge costs in the corresponding path through the graph, and an optimal d is one with minimum-cost path.

For graphs with this structure, it is well-known that minimum-cost paths can be found by dynamic programming (DP). DP has been applied previously to feature-based approaches to stereo that seek to match extracted edges or intervals between edges, as in a paper by Y. Ohta and T Kanade titled "Stereo by intra- and inter-scanline search using dynamic programming," published in IEEE Trans Pattern Analysis and Machine Intelligence, PAMI-7(2):139–154, March 1985. The approach here differs by being based on a type of cross-correlation at every pixel and by deriving cost terms from the statistical model; nevertheless, once the graph and the weights are defined, the optimization algorithm is very similar. The data structure necessary for the algorithm consists of two fields for each vertex. One field stores the total cost of the optimal path up to this node; the other is a black pointer that indicates the immediately preceding vertex on this path (i.e., for column i, it points to a vertex in column i-1). The algorithm itself consists of a forward pass that computes the path costs and the back pointers, followed by a reverse pass that traces the back pointers to extract the optimal path from the data structure. See Table 1 below. The forward pass considers each column of the array in turn from left to right across the scanline Each column is processed with a nested loop that considers each vertex in that column and for each vertex in the current column considers the edges to all vertices in the previous column For each incoming edge, the cost of the optimal path traversing that edge is the sum of the optimal cost at the previous vertex and the costs for this edge and the current vertex. The minimum cost over all incoming edges is stored at the current vertex together with a pointer to the appropriate vertex of the previous column. This procedure is repeated for all vertices in the current column and then for all columns across the scanline The reverse pass locates the end of the optimal path by finding the minimum-cost vertex in the final column and then traces the back pointers from there. The correctness of this algorithm can be proven by induction on the path length The computational complexity of the algorithm is $O(NC^2)$, where C is the maximum number of candidate vertices per column If all disparities in a fixed search range are considered as candidates, then C is the width of the search range. Table 1 below gives a pseudocode listing of the algorithm

TABLE 1

Forward pass:
    For each column i
        For candidate j
            Compute vertex cost
            For all candidates in column i-1
                Compute edge costs
                Compute total path cost as sum
                    of previous total path
                    cost, edge cost, and new
                    vertex cost
            Choose the minimum total cost among
                incoming paths, assign it as the
                total cost to this vertex, and
                set a back pointer to the appropriate vertex of the previous column.
Reverse pass:
    Find the minimum total cost in Column N
    Trace the back pointers to find the optimal path.

To summarize, joint 1-D estimators of the disparity vector d within each scanline have been derived by applying the MAP criterion to a Bayesian formulation of the 1-D stereo problem It has been shown that one such estimator is equivalent to combining the SSD cross-correlation measure with the 1-D version of the membrane model regularizing function, and that optimal estimates in this case can be obtained with dynamic programming applied independently to each scanline. In the derivation, it was assumed that intensity differences were computed only for $1 \times 1$ windows around each pixel. The same approach applies to larger rectangular windows that overlap adjacent scanlines This algorithm has the convenience that the embedded surface model will interpolate over textureless regions of the image. Also, the likelihood of gross errors in disparity can be reduced by heavily weighting the surface model term, though at the cost of over-smoothing the estimated disparity field In comparison to other stereo algorithms using surface smoothness models with 2-D interactions, with the present approach it is possible to find the globally optimal disparity estimates (within each scanline) efficiently. This algorithm has been used very successfully in outdoor autonomous navigation.

As indicated earlier, a related prior probability model can be developed for the case in which prior disparity information is available at each pixel. The independent model used for illustration at the start of this section was one example of such a model. In that case, the prior mean vector $\bar{d}$ was not zero, but could specify a different value at each pixel The inverse covariance matrix was diagonal. This can be generalized to include correlation in the prior distribution, which will lead to a nondiagonal inverse covariance matrix. Such correlation will exist if the prior disparity information was obtained by matching with previous images, as noted above. Such correlation can be modeled with the first-order Markov covariance function $\rho^{|\tau|}$ with $0 < \rho < 1$. That is, the prior covariance between pixels $x_i$ and $x_j$ would be given by the covariance function $$K(i,j) = \rho^{|i-j|}, \quad (10)$$

This covariance function has the inverse covariance matrix where $C^{-1}$ is $$\frac{1}{1-\rho^2}\begin{vmatrix} 1 & -\rho & 0 & \ldots & 0 & 0 \\ -\rho & 1+\rho^2 & -\rho & \ldots & 0 & 0 \\ 0 & -\rho & 1+\rho^2 & \ldots & 0 & 0 \\ \cdot & \cdot & \cdot & \ldots & \cdot & \cdot \\ \cdot & \cdot & \cdot & \ldots & \cdot & \cdot \\ \cdot & \cdot & \cdot & \ldots & \cdot & \cdot \\ 0 & 0 & 0 & \ldots & -\rho & 1 \end{vmatrix} \quad (11)$$

Since this is tridiagonal, this model would allow the same DP optimization algorithm to be used to estimate disparity as was described above for the regularization-based prior Equations (10) and (11) show this model as being stationary; however, it can be generalized to the nonstationary case with different variances at each pixel.

To summarize, a joint 1-D disparity estimation algorithm based on a 1-D membrane surface smoothness model and dynamic programming optimization has been described. Results with this algorithm have been very good, indoors and outdoors. The algorithm is slower than the "0-D," cross-correlation algorithm discussed earlier; moreover, because the computational complexity of DP is quadratic, the relative speed degrades quickly as the disparity range increases. Referring to FIG. 1, the invention also encompasses a method of near real-time stereo vision comprising the steps of (1) producing a first video output image responsive to light from an object scene;
(2) producing a second video output image responsive to light from the object scene;
(3) digitizing the first video signal to produce digital representations of the first video image;
(4) digitizing the second video signal to produce digital representations of the second video image;
(5) videoprocessing the digital representations by successively producing sequential Laplacian stereo image pyramid pairs from the digital representations of the first and second video images; and
(6) calculating a disparity map of the object scene and storing an array of numerical values corresponding to the disparity at each pixel of a digital representation of the object scene.

In a first variation of the method of the invention the calculating of the disparity map includes estimating disparity independently at each pixel, using a so-called 0-D algorithm In a second variation of the method of the invention the calculating of the disparity map includes estimating disparity jointly over a row of pixels in a scanline, using a so-called 1-D algorithm. Using the 0-D algorithm saves computational time, but using the 1-D algorithm is perhaps more reliable.

Referring to FIGS. 2 and 3, the videoprocessing of step (5) above operates on the digital representations of the first and second video images in the form of digitized image arrays $(G_0)_{left}$ and $(G_0)_{right}$ in the following sequence of steps:

(a) low-pass filtering $(G_0)_{left}$ to produce an image $(G_1)_{left}$;

(b) subtracting $(G_1)_{left}$ from $(G_0)_{left}$ to produce an image $(L_0)_{left}$ which retains high-frequency information of $(G_0)_{left}$;

(c) subsampling $(G_1)_{left}$, by taking every other pixel in every other line to remove the total number of pixels in the image by a factor of four and produce a subsampled $(G_1)_{left}$;

(d) lowpass-filtering the subsampled $(G_1)_{left}$ to produce a filtered image $(G_1)_{left}$;

(e) subtracting from the subsampled $(G_1)_{left}$ to produce an image $(L_1)_{left}$ which retains high-frequency information of $(G_1)_{left}$;

(f) subsampling $(G_2)_{left}$, by taking every other pixel in every other line to remove the total number of pixels in the image by a factor of four and produce a subsampled $(G_2)_{left}$;

(g) lowpass-filtering $(G_2)_{left}$ to produce a filtered image $(G_3)_{left}$;

(h) subtracting $(G_3)_{left}$ from $(G_2)_{left}$ to produce an image $(L_2)_{left}$ which retains high-frequency information of $(G_2)_{left}$; and (i) performing steps (a) through (h) as described above starting with $(G_0)_{right}$.

In terms of an inverse frame rate of the videocameras, the following sequence of events occurs during a first frametime the stereo pair $(G_0)_{left}$ and $(G_0)_{right}$ are acquired, during a second frametime the $(L_0)_{left}$ and $(G_1)_{left}$ are calculated, during a third frametime $(L_0)_{right}$ and $(G_1)_{right}$ are calculated, and during a fourth frametime and subsequently the remaining Laplacian pyramid images are calculated.

The method of the present invention can additionally comprise further recursion of steps (a) through (i) described above to give left and right Laplacian pyramid images $L_3$, $L_4$, and so forth as may be necessary or desired in a particular application.

In the present invention, one further recursion is carried out for left and right Laplacian images $L_3$ of size 60×64 pixels.

Referring to FIG. 4, in the above description of the method of the invention the calculating of the disparity map includes the stereo correlation of the left and right stereo Laplacian pyramid images produced as described from the digital representations of the first and second video images. The stereo calculation is effected by the steps of shifting the left Laplacian pyramid image over a selected range of disparity values from $d_{min}$ to $d_{max}$ to produce a series of shifted Laplacian pyramid images;

subtracting the shifted Laplacian pyramid images from the right Laplacian pyramid image to give a difference image consisting of a plurality of difference values corresponding to the plurality of individual pixels;

squaring the difference values of a particular difference image to produce a plurality of squared difference values;

summing, over a local window of predetermined width, the plurality of squared difference values which produces a sum-of-squared-differences (SSD) image for each value of shift d from $d_{min}$ to $d_{max}$ to produce a plurality of such SSD images;

finding the minimum over d for the SSD at each pixel and carrying out a posterior probability calculation;

using the minimum over d for the SSD and the posterior probability calculation to select the probability of the best d; and using the minimum over d for the SSD to output a disparity image, consisting of a plurality of individual disparity values.

In a variation of the method of the invention, the finding of the minimum over d is replaced by dynamic programming optimization, and the calculating of the disparity map includes estimating disparity jointly over a row of pixels in a scanline.

The method described above may additionally comprise the steps of:

(i) calculating an output confidence image of the object scene, and (ii) storing an array of numerical values corresponding to the output confidence image.

In particular, the calculating of an output confidence image of the object scene in step (i) above comprises using the minimum over d for the SSD and the posterior probability calculation to select the probability of the best d.

The first autonomous cross-country robotic traverses (of up to 100 meters) have been achieved using the stereo vision system of the present invention with all computing done aboard the vehicle. The overall approach disclosed herein provides a unifying paradigm for practical domain-independent stereo ranging.

Those having skill in the arts relevant to the present invention will undoubtedly think of various obvious modifications or additions to the invention based upon the preferred embodiment disclosed herein. Therefore, it should be understood that the invention is not to be limited to the disclosed embodiment, but is to be limited only by the scope of the following claims.

U.S. Government Sponsorship under NASA contract NAS7-918 is acknowledged.

October 26, 1990

```
/*****************************************************************
* include files *
*****************/
```

```
#include <vxWorks.h>
#include "generics.h"
#include "taskLib.h"
#include "roi.h"

#define    MaxLevel 6

IMPORT    roiImage    *openRoiImage();

IMPORT    roiImage    *A0,*A1,*A2,*A3,*B0,*B1,*B2,*B3,*C0,
                      *C1,*C2,*C3,*D0,*D1,*D2,*D3;

IMPORT    RS_DESC    *roiLeft,*roiRight;
IMPORT    int        PCOUNT;
IMPORT    SEM_ID     PFLAG;
IMPORT    SEM_ID     DQFLAG;

EXPORT roiImage    *leftGnSrc[MaxLevel],*leftLn[MaxLevel],
                    *leftGnDest[MaxLevel];
EXPORT roiImage    *rightGnSrc[MaxLevel],
                    *rightLn[MaxLevel],
                    *rightGnDest[MaxLevel];

initLeftPyramid()
{
    int    level;
    XY_PAIR position,lastPosition,size,size2;
    size.x      = 512;
    size.y      = 480;
    size2.x     = size.x>>1;
    size2.y     = size.y>>1;
    position.x  = 0;
    position.y  = 0;
    for (level=0;level<MaxLevel;level++) {
  if (level==0) {
      leftGnSrc[level] = openRoiImage(0,position,size);
      leftLn[level]    = openRoiImage(1,position,size);
```

```
        leftGnDest[level]= openRoiImage(8,position,size2);
    }
    else {
        leftGnSrc[level] = openRoiImage(8,lastPosition,size);

leftLn[level]    = openRoiImage(2,lastPosition,size);

leftGnDest[level]= openRoiImage(8,position,size2);
    }
    lastPosition = position;
    size.x   /=2;
    size.y   /=2;
    size2.x  /=2;
    size2.y  /=2;
    position.x += size.x/2;
    position.y += size.y;
      }
} initRightPyramid()
{
    int   level;
    XY_PAIR position,lastPosition,size,size2;
    size.x      = 512;
    size.y      = 480;
    size2.x     = size.x>>1;
    size2.y     = size.y>>1;
    position.x  = 0;
    position.y  = 0;
    lastPosition = position;
    position.x  = 256;
    for (level=0;level<MaxLevel;level++) {
  if (level==0) {
     rightGnSrc[level] = openRoiImage(4,lastPosition,size);

rightLn[level]    = openRoiImage(5,lastPosition,size);

rightGnDest[level]= openRoiImage(8,position,size2);
```

```
    }
    else {
        rightGnSrc[level] = openRoiImage(8,lastPosition,size);

rightLn[level]    = openRoiImage(2,lastPosition,size);

rightGnDest[level]= openRoiImage(8,position,size2);
    }
    lastPosition = position;
    size.x   /=2;
    size.y   /=2;
    size2.x  /=2;
    size2.y  /=2;
    position.y += size.y;
      }
}
initStereoPyramids()
{
    initLeftPyramid();
    initRightPyramid();
} leftFSDPyr(times)
int times;
{
    int   level;
    fill(A2,0);
    fill(C0,0);
    dgLap(0);
    display12();
    for (PCOUNT=times;PCOUNT !=0 ;PCOUNT++) {
        grab2Show2(A0,A2,C0);
        for (level=0;level<MaxLevel;level++) {
            fsdImage(leftGnSrc[level],leftLn[level],
            leftGnDest[level]);
    }
      }
}
```

```
rightFSDPyr(times)
int times;
{
    int  level;
    fill(A2,0);
    fill(C0,0);
    dgLap(0);
    display12();
    for (PCOUNT=times;PCOUNT !=0 ;PCOUNT++) {
        grab2Show2(A0,A2,C0);
   for (level=0;level<MaxLevel;level++) {
       fsdImage(rightGnSrc[level],rightLn[level],
       rightGnDest[level]);
   }
    }
} void
stereoFSD(times)
int times;
{
    int level;
    semInit(PFLAG);
    semInit(DQFLAG);
    semGive(PFLAG);
    semGive(DQFLAG);
    fill(A2,0,0,0,0,0);
    fill(C0,0,0,0,0,0);
    dgLap(0);
    display12();
    for (PCOUNT=times;PCOUNT !=0 ;PCOUNT++) {
        grab2Show2(A0,A2,C0);
        for (level=0;level<MaxLevel;level++) {
            fsdImage(rightGnSrc[level],rightLn[level],
             rightGnDest[level]);
            fsdImage(leftGnSrc[level],leftLn[level],
             leftGnDest[level]);
    }
```

```
        }
        rsRIdle(roiRight,DQ_P40BUS);
        rsRIdle(roiLeft,DQ_P40BUS);
} stereoFSD2(times)
int times;
{
    int level;
    fill(A2,0,0,0);
    fill(C0,0,0,0);
    dgLap(0);
    display12();
    grab2Show2(A0,A2,C0);
    for (level=0;level<MaxLevel;level++) {
        fsdImage(rightGnSrc[level],rightLn[level],
          rightGnDest[level]);
        fsdImage(leftGnSrc[level],leftLn[level],
          leftGnDest[level]);
    }
    for (;times !=0 ;times--) {
        grab2Show2(A0,A2,C0);
        wireRoi7(DQ_ALTERN);
        rsWZoom(roiRight,1);
        for (level=0;level<MaxLevel;level++) {
            out56inL9R10(rightGnSrc[level],rightLn[level],
              rightGnDest[level]);
            out56inL9R10(leftGnSrc[level],leftLn[level],
              leftGnDest[level]);
        }
        wireRoi7(DQ_PRIMARY);
        rsWZoom(roiRight,0);
    }
    rsRIdle(roiRight,DQ_P40BUS);
    rsRIdle(roiLeft,DQ_P40BUS);
} stereoSub(times)
```

```
int times;
{
    dgLap(0);
    display12();
    for (PCOUNT=times;PCOUNT !=0 ;PCOUNT++) {
        grab2Show2(A0,A1,B1);
        subImage(A0,B0,A1);
    }
}
```

---

We claim:

1. A near real-time stereo vision apparatus comprising:
   first videocamera means for producing a first video output image responsive to light from an object scene;
   second videocamera means for producing a second video output image responsive to light from said object scene;
   first digitizing means for digitizing said first video image, having an input connected to an output of said first videocamera means, and having an output at which digital representations of said first video image appear;
   second digitizing means for digitizing said second video image, having an input connected to an output of said second videocamera means, and having an output at which digital representations of said second video image appear;
   videoprocessing means for successively producing sequential left and right stereo Laplacian pyramid images from said digital representations of said first and second video signals, having first and second inputs connected to said outputs of said first and second digitizing means; and
   disparity map calculating means for calculating a disparity map of said object scene, operatively connected to said videoprocessing means and having storage means for storing an array of numerical values corresponding to the disparity at each pixel of a digital representation of said object scene;
   wherein said disparity map can be used to generate control signals for semi-autonomous operation of a robotic vehicle or the like.

2. The near real-time stereo vision apparatus of claim 1 wherein said disparity map calculating means includes stereo correlation means for correlating said left and right stereo Laplacian pyramid images.

3. The near real-time stereo vision apparatus of claim 2 additionally comprising an output confidence image means for calculating an output confidence image of said object scene, operatively connected to said stereo correlation means and having storage means for storing an array of numerical values corresponding to said output confidence image.

4. The near real-time stereo vision apparatus of claim 3 wherein said stereo correlation means comprises:
   shifting means for shifting said left Laplacian pyramid image over a selected range of disparity values from $d_{min}$ to $d_{max}$ to produce a series of shifted Laplacian pyramid images;
   subtracting means for subtracting said shifted Laplacian pyramid images from said right Laplacian pyramid image to give a difference image consisting of a plurality of difference values;
   sum-of-squared-differences (SSD) means for calculating a sum-of-squared-differences (SSD) image for each value of shift d from $d_{min}$ to $d_{max}$ to produce a plurality of such SSD images, including squaring means for squaring said difference values of a particular difference image to produce a plurality of squared difference values, and summing means for summing, over a local window of predetermined width, said plurality of squared difference values;
   minimum finding means for finding the minimum over d for said SSD; and
   disparity image output means for using said minimum over d for said SSD to output a disparity image consisting of a plurality of individual disparity values.

5. The near real-time stereo vision apparatus of claim 4 wherein said output confidence image means comprises:
   posterior probability calculation means for carrying out a posterior probability calculation, operatively connected to said sum-of-squared-differences (SSD) means;
   selection means for using said minimum over d for said SSD and said posterior probability calculation to select the probability of the best d, operatively connected to said posterior probability calculation means and to said minimum finding means; and
   confidence image output means for using said best d to output a confidence image.

6. The near real-time stereo vision apparatus of claim 5 wherein said minimum finding means is replaced with dynamic programming optimization means for estimating disparity jointly over a row of pixels in a scanline, operatively connected to said sum-of-squared-differences (SSD) means.

7. The near real-time stereo vision apparatus of claim 6 wherein said first and second digitizing means and said videoprocessing means include image processing VME boards comprising:
   first and second A/D digitizer boards;
   a frame store board for storing three video frames, operatively connected to said first and second A/D digitizer boards;

first and second region-of-interest (ROI) eight-frame store boards for doing subsampling, operatively connected to said first and second A/D digitizer boards and to said frame store board;

a video finite impulse response (VFIR) board capable of lowpass filtering at video rates, operatively connected to said first and second region-of-interest (ROI) eight-frame store boards; and a general purpose arithmetic and logic (ALU) board for doing subtractions, operatively connected to said first and second region-of-interest (ROI) eight-frame store boards and to said video finite impulse response (VFIR) board.

8. The near real-time stereo vision apparatus of claim 7 additionally comprising mounting means including two three-axis rotation platforms, for mounting said first and second videocameras so that said cameras can be adjustably mounted on a robotic vehicle or the like with parallel optical axes and appropriate roll about the optical axis.

9. A method of near real-time stereo vision comprising:

producing a first video output signal responsive to light from an object scene;

producing a second video output image responsive to light from said object scene;

digitizing said first video image to produce digital representations of said first video image;

digitizing said second video image to produce digital representations of said second video image;

videoprocessing said digital representations by successively producing sequential Laplacian stereo image pyramid pairs from said digital representations of said first and second video images; and calculating a disparity map of said object scene and storing an array of numerical values corresponding to the disparity at each pixel of a digital representation of said object scene.

10. The method of claim 9 wherein said calculating of said disparity map includes the stereo correlation of said left and right stereo Laplacian pyramid images from said digital representations of said first and second video images, comprising:

shifting said left Laplacian pyramid image over a selected range of disparity values from $d_{min}$ to $d_{max}$ to produce a series of shifted Laplacian pyramid images;

subtracting said shifted Laplacian pyramid images from said right Laplacian pyramid image to give a difference image consisting of a plurality of difference values corresponding to individual pixel values;

squaring said difference values of a particular difference image to produce a plurality of squared difference values;

summing, over a local window of predetermined width, said plurality of squared difference values;

calculating a sum-of-squared-differences (SSD) image for each value of shift d from $d_{min}$ to $d_{max}$ to produce a plurality of such SSD images;

finding the minimum over d for said SSD and carrying out a posterior probability calculation;

using said minimum over d for said SSD and said posterior probability calculation to select the probability of the best d; and using said minimum over d for said SSD to output a disparity image, consisting of a plurality of individual disparity values.

11. The method of claim 10 wherein said finding said minimum is replaced by dynamic programming optimizing, and wherein said calculating of said disparity map includes estimating disparity jointly over a row of pixels in a scanline.

12. The method of claim 9 additionally comprising:

calculating an output confidence image of said object scene, and storing an array of numerical values corresponding to said output confidence image of said object scene, and storing an array of numerical values corresponding to said output confidence image.

13. The method of claim 12 wherein said calculating an output confidence image of said object scene comprises:

using said minimum over d for said SSD and said posterior probability calculation to select the probability of the best d.

14. The method of claim 9 wherein said videoprocessing operates on said digital representations of said first and second video images in the form of digitized image arrays $(G_0)_{left}$ and $(G_0)_{right}$, comprising:

(a) low-pass filtering said $(G_0)_{left}$ to produce an image $(G_1)_{left}$;

(b) subtracting said $(G_1)_{left}$ from $(G_0)_{left}$ to produce an image $(L_0)_{left}$ which retains high-frequency information of $(G_0)_{left}$;

(c) subsampling said $(G_1)_{left}$, by taking every other pixel in every other line to remove the total number of pixels in the image by a factor of four and produce a subsampled $(G_1)_{left}$;

(d) lowpass-filtering said subsampled $(G_1)_{left}$ to produce a filtered image $(G_2)_{left}$;

(e) subtracting said $(G_2)_{left}$ from said subsampled $(G_1)_{left}$ to produce an image $(L_1)_{left}$ which retains high-frequency information of $(G_1)_{left}$;

(f) subsampling said $(G_2)_{left}$, by taking every other pixel in every other line to remove the total number of pixels in the image by a factor of four and produce a subsampled $(G_2)_{left}$;

(g) lowpass-filtering said subsampled $(G_2)_{left}$ to produce a filtered image $(G_3)_{left}$;

(h) subtracting said $(G_3)_{left}$ from subsampled $(G_2)_{left}$ to produce an image $(L_2)_{left}$ which retains high-frequency information of $(G_2)_{left}$; and (i) performing steps (a) through (h) as described above starting with $(G_0)_{right}$.

15. The method of claim 14 wherein in terms of an inverse frame rate of said videocameras, the following sequence of events occurs; during a first frametime said stereo pair $(G_0)_{left}$ and $(G_0)_{right}$ are acquired, during a second frametime said $(L_0)_{left}$ and $(G_1)_{left}$ are calculated, during a third frametime said $(L_0)_{right}$ and $(G_1)_{right}$ are calculated, and during a fourth frametime and subsequently the remaining Laplacian pyramid images are calculated.

16. The method of claim 14, additionally comprising further recursion of steps (a) through (i) to give left and right Laplacian pyramid imaged $L_3$, $L_4$, and so forth ad libitum.

* * * * *